H. J. KOELSCH.
NECK YOKE.
APPLICATION FILED OCT. 3, 1917.
1,275,446.
Patented Aug. 13, 1918.
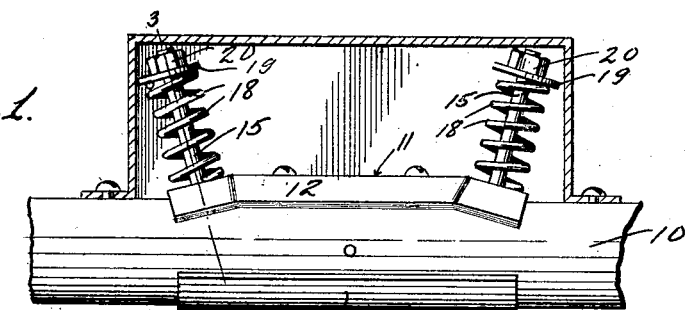
Fig. 1.
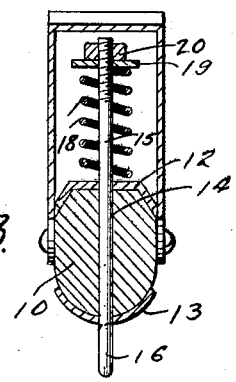
Fig. 3.
Fig. 2.
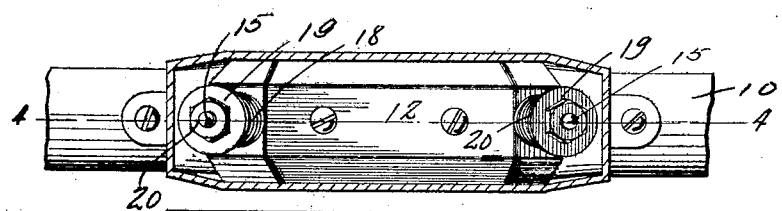
Fig. 4.
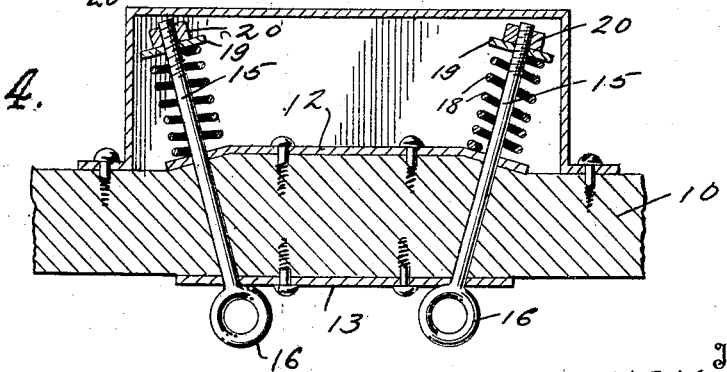
Witnesses
G. C. Walking
H. M. Teet
Inventor
H. J. Koelsch
By 
Attorney

UNITED STATES PATENT OFFICE.

HENRY J. KOELSCH, OF MILWAUKEE, WISCONSIN.

NECK-YOKE.

1,275,446.  Specification of Letters Patent.  Patented Aug. 13, 1918.

Application filed October 3, 1917. Serial No. 194,532.

*To all whom it may concern:*

Be it known that I, HENRY J. KOELSCH, a citizen of the United States, residing at Milwaukee, in the county of Milwaukee, State of Wisconsin, have invented certain new and useful Improvements in Neck-Yokes; and I do hereby declare the following to be a full, clear, and exact description of the invention, such as will enable others skilled in the art to which it appertains to make and use the same.

This invention relates to improvements in neckyokes and particularly to resilient neckyokes.

One object of the present invention is to provide a novel and simple means whereby the jar incident to the sudden forward jerk of the animals in starting is greatly relieved.

Another object is to provide a device of this character wherein the resilient means is so mounted that there will be a more or less gentle stretching action when the animals begin to pull.

Other objects and advantages will be apparent from the following description when taken in connection with the accompanying drawing.

In the drawing:

Figure 1, is a fragmentary top plan view of a neckyoke in accordance with the invention showing the casing or housing in sections.

Fig. 2, is a vertical longitudinal sectional view through the housing or casing showing the remote parts in side elevation.

Fig. 3 is a transverse sectional view taken on the line 3—3 of Fig. 1.

Fig. 4 is a horizontal longitudinal sectional view taken on the line 4—4 of Fig. 2.

Referring particularly to the accompanying drawing 10 represents a yoke the rear portion of the center of which is formed with a rearwardly extending enlargement 11. The said enlargement is formed with the inclined end portions which are covered, as well as the intermediate portion thereof, with a metal plate 12. Secured to the forward side of the yoke, directly opposite to the plate 12, is a plate 13, and formed horizontally through the yoke and through the ends of the plates, are the openings 14. Disposed slidably through these openings are the bolts 15, the forward ends of which are formed with eyes 16 for attachment of a ring 17 which is arranged to be connected to the draft pole or tongue of the vehicle. The bolts 15 extend a distance rearwardly of the rear plate 12, and engaged on these portions of the bolts are the coil springs 18. On the rear threaded ends of the bolts there are engaged the washers 19 and the nuts 20, the former of which bear on the adjacent ends of the springs, while by means of the latter the tension of the springs can be readily and quickly regulated.

It will be noted that the bolts extend through the yoke in rearward divergent relation to each other, said bolts passing through the before-mentioned inclined ends of the rear enlargement 11 of the yoke. Thus the pull is not directly forwardly and rearwardly, but in directions obliquely to the movement of the yoke. This will prevent a too sudden forward movement of the bolts when the animals pull, the bolts frictionally engaging with the walls of the openings to such an extent as to produce this effect.

What is claimed is:

The combination with a neckyoke, of independent eye bolts spaced from each other and slidable through the yoke in forward convergent relation to one another, coiled springs mounted and acting directly upon the eye bolts to resist their movement in one direction and a housing completely inclosing the springs and the ends of the bolts carrying the same.

In testimony whereof, I affix my signature in the presence of two witnesses.

HENRY J. KOELSCH.

Witnesses:
H. J. ROCK,
H. R. SCHUMANN.

Copies of this patent may be obtained for five cents each, by addressing the "Commissioner of Patents, Washington, D. C."